United States Patent
Jones et al.

(10) Patent No.: US 9,551,838 B2
(45) Date of Patent: Jan. 24, 2017

(54) OPTICAL BRIDGE

(71) Applicant: ROCKLEY PHOTONICS LIMITED, Marlborough, Wiltshire (GB)

(72) Inventors: Haydn Frederick Jones, Reading (GB); Andrew George Rickman, Marlborough (GB); Aaron Zilkie, Pasadena, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 14/868,116

(22) Filed: Sep. 28, 2015

(65) Prior Publication Data
US 2016/0091665 A1   Mar. 31, 2016

Related U.S. Application Data

(60) Provisional application No. 62/057,818, filed on Sep. 30, 2014.

(30) Foreign Application Priority Data

Nov. 11, 2014 (GB) .................................. 1420070.3

(51) Int. Cl.
*G02B 6/28* (2006.01)
*G02B 6/35* (2006.01)
(Continued)

(52) U.S. Cl.
CPC ........... *G02B 6/356* (2013.01); *G02B 6/12021* (2013.01); *G02B 6/3546* (2013.01);
(Continued)

(58) Field of Classification Search
CPC .. H04J 14/02; H04Q 11/0005; G02B 6/12007; G02B 6/29395; G02B 6/2938; G02B 6/28
(Continued)

(56) References Cited

U.S. PATENT DOCUMENTS

| 5,029,981 A | 7/1991 | Thompson |
| 6,415,080 B1 | 7/2002 | Sappey et al. |

(Continued)

FOREIGN PATENT DOCUMENTS

| EP | 1 761 103 A1 | 3/2007 |
| WO | WO 2011/076442 A1 | 6/2011 |

OTHER PUBLICATIONS

Search Report for Application No. GB1420070.3; mailed May 26, 2015, dated May 22, 2015. 3 pages.

(Continued)

*Primary Examiner* — Jennifer Doan
(74) *Attorney, Agent, or Firm* — Lewis Roca Rothgerber Christie LLP

(57) ABSTRACT

An optical bridge for switching between a plurality of electrical chips, the optical bridge comprising: a passive optical router; and a plurality of Bridge Interface Chips optically connected to the passive optical router; each Bridge Interface Chip being connectable to one of the plurality of electrical chips to form a connection between that electrical chip and the passive optical router at which electrical signals from the electrical chip are converted into wavelength tunable modulated optical signals for transmission to the passive optical router and at which an optical signals from the passive optical router are converted into electrical signals to be received by the electrical chip; wherein each Bridge Interface Chip includes a wavelength tunable laser input and a modulator for modulating the wavelength tunable laser input to provide the wavelength tunable modulated optical signals.

22 Claims, 8 Drawing Sheets

(51) Int. Cl.
G02B 6/12 (2006.01)
H04Q 11/00 (2006.01)
H04J 14/02 (2006.01)
H04B 10/80 (2013.01)
G02B 6/42 (2006.01)

(52) U.S. Cl.
CPC ........ *H04B 10/801* (2013.01); *H04J 14/0212* (2013.01); *H04J 14/0284* (2013.01); *H04Q 11/0005* (2013.01); *G02B 6/3596* (2013.01); *G02B 6/4246* (2013.01); *H04Q 2011/006* (2013.01)

(58) Field of Classification Search
USPC .......................... 385/1, 2, 10, 15, 24, 31, 37
See application file for complete search history.

(56) References Cited

U.S. PATENT DOCUMENTS

| | | | |
|---|---|---|---|
| 6,768,827 | B2 | 7/2004 | Yoo |
| 6,873,763 | B2 | 3/2005 | Nikonov |
| 7,505,686 | B2 | 3/2009 | Jennen |
| 7,570,844 | B2 | 8/2009 | Handelman |
| 7,885,492 | B2 | 2/2011 | Welch et al. |
| 8,401,385 | B2 | 3/2013 | Spivey et al. |
| 8,403,571 | B2 | 3/2013 | Walker |
| 8,503,879 | B2 | 8/2013 | Xu et al. |
| 8,724,988 | B2 | 5/2014 | Andriolli et al. |
| 2003/0138189 | A1 | 7/2003 | Rockwell et al. |
| 2011/0013905 | A1 | 1/2011 | Wang et al. |
| 2013/0101290 | A1* | 4/2013 | Anandarajah .......... H04B 10/58 398/49 |

OTHER PUBLICATIONS

Acacia Communications, Acacia Communications Announces Industry's First Single-Chip Silicon Photonics 100G Coherent Transceiver, Press Release, Mar. 10, 2014 (Retrieved from https://web.archive.org/web/20140923061327/http://acacia-inc.com/acacia-communications-announces-industrys-first-single-chip-silicon-photonics-100g-coherent-transceiver/).

Bregni, S. et al., Architectures and Performance of AWG-based Optical Switching Nodes for IP Networks, Sep. 2003, pp. 1-35, Department of Electronics and Information, Politecnico di Milano, Italy.

Farrington, N. et al., A Demonstration of Ultra-Low-Latency Data Center Optical Circuit Switching, ACM SIGCOMM Computer Communication Review, Aug. 13-17, 2012, vol. 42, No. 4, pp. 95-96, ACM, Helsinki, Finland.

Farrington, N. et al., Data Center Switch Architecture in the Age of Merchant Silicon, Department of Computer Science and Engineering, Proceedings of IEEE Hot Interconnects, 2009, 10 Pages, University of California San Diego, California.

Farrington, N. et al., Facebook's Data Center Network Architecture, IEEE Optical Interconnects Conference, May 7, 2013, 2 Pages, IEEE, Santa Fe, New Mexico. (Retrieved from http://nathanfarrington.com).

Farrington, N. et al., Helios: A Hybrid Electrical/Optical Switch Architecture for Modular Data Centers, SIGCOMM'10, Aug. 30-Sep. 3, 2010, 12 Pages, ACM, New Delhi, India.

Kachris, C. et al., A Survey on Optical Interconnects for Data Centers, IEEE Communications Surveys & Tutorials, Fourth Quarter 2012, pp. 1021-1036, vol. 14, No. 4, IEEE.

Ngo, H.Q. et al., Optical Switching Networks with Minimum Number of Limited Range Wavelength Converters, INFOCOM 2005, 24th Annual Joint Conference of the IEEE Computer and Communications Societies, 2005, vol. 2, pp. 1128-1138, IEEE.

Ngo, H.Q. et al., Constructions and Analyses of Nonblocking WDM Switches Based on Arrayed Waveguide Grating and Limited Wavelength Conversion, IEEE/ACM Transactions on Networking, Feb. 2006, pp. 205-217, vol. 14, No. 1, IEEE.

Proietti, R. et al., 40 Gb/s 8×8 Low-Latency Optical Switch for Data Centers, Optical Fiber Communication Conference/National Fiber Optic Engineers Conference, 2011, 3 Pages, Optical Society of America.

Proietti, R. et al., TONAK: A Distributed Low-latency and Scalable Optical Switch Architecture, ECOC 2013, 2013, pp. 1005-1007, 39th European Conference and Exhibition on Optical Communication.

Urata, R. et al., 4×4 optical packet switching of asynchronous burst optical packets with a prototype, 4×4 label processing and switching sub-system, Optics Express, Jul. 19, 2010, pp. 15283-15288, vol. 18, No. 15, Optical Society of America.

Xi, K. et al., Petabit Optical Switch for Data Center Networks, Sep. 11, 2010, pp. 1-9, Polytechnic Institute of New York University, Brooklyn, New York.

Ye, T. et al., A Study of Modular AWGs for Large-Scale Optical Switching Systems, Journal of Lightwave Technology, Jul. 1, 2012, pp. 2125-2133, vol. 30, No. 13, IEEE.

Ye, T. et al., AWG-Based Non-Blocking Clos Networks, IEEE/ACM Transactions on Networking, Apr. 2015, pp. 491-504, vol. 23, No. 2, IEEE.

* cited by examiner

OPTICAL BRIDGE

CROSS-REFERENCE TO RELATED APPLICATION(S)

The present application claims priority to and the benefit of U.S. Provisional Application No. 62/057,818, filed Sep. 30, 2014, the entire content of which is incorporated herein by reference, and the present application claims priority to GB Application No. 1420070.3, filed Nov. 11, 2014, the entire content of which is incorporated herein by reference.

FIELD

The present invention relates to an optical bridge for interconnecting a plurality of electrical chips, particularly to a switch fabric including a passive optical router.

BACKGROUND

The loads placed on existing data centers and other networks are increasing as internet traffic continues to rise, driven by an increasing number of high bandwidth devices such as smart phones, tablets, laptops and gaming consoles and also by other data intensive and speed dependent applications such as video communications and stock trading.

Conventional data center networks suffer from poor scalability and are prone to other faults and limitations including bandwidth bottlenecking and single point failure.

Hybrid electrical/optical switching systems such as that of U.S. Pat. No. 8,503,879 are known to address bandwidth problems of conventional data center networks. However, such systems are complex resulting in high manufacturing times and costs.

Thus, there is a need for an optical bridge addressing these shortcomings.

SUMMARY

Accordingly, the present invention aims to solve the above problems by providing an optical bridge for switching between a plurality of electrical chips, the optical bridge comprising: a passive optical router, the optical path through which is wavelength dependent; and a plurality of Bridge Interface Chips optically connected to the passive optical router; each Bridge Interface Chip being connectable to one of the plurality of electrical chips to form a connection between that electrical chip and the passive optical router; each Bridge Interface Chip including a wavelength tunable laser input and a modulator configured to convert electrical signals from the electrical chip into wavelength tunable modulated optical signals for transmission to the passive optical router; and each Bridge Interface Chip including a photodiode configured to convert optical signals from the passive optical router into electrical signals to be received by the electrical chip.

Each Bridge Interface Chip may be a transceiver.

In this way, an improved system for switching between electrical chips is provided which allows each electrical chip to be switched to send signals to, and to receive signals from, each other electrical chip within the plurality of electrical chips, creating an "invisible" bridging interface amongst the chips allowing each electrical chip to be connected to every other chip. The wavelength of any wavelength tunable modulated optical signal transmitted by a Bridge Interface Chip (transceiver) to the passive optical router corresponds to the wavelength of the tunable laser input of that Bridge Interface Chip (transceiver). By controlling the wavelength of the modulated optical signal at the input to the optical switch fabric, the destination port of the passive optical router is controlled.

The modulation of the wavelength tunable input may be any suitable type of modulation, for example amplitude modulation, phase modulation, phase-shift keying etc.

Compared to related art switching systems such as electrical backplane switching, which rely on electrical switching configurations, the present invention provides a switching system which exhibits, for example: lower power consumption; smaller size; better scalability to higher switch radix and a lower cost of manufacture.

Each electrical chip may comprise more than one port and the optical bridge circuit fabric may be connectable to each port via a Bridge Interface Chip per port.

In addition to the wavelength tunable laser and modulator, the skilled person would understand that each Bridge Interface Chip may include standard transceiver components, for example, the Bridge Interface Chip may include: an optical receiver, electrical modulator driver, electrical receiver circuit, switching signal interpreter and interposer circuit. The wavelength of the wavelength tunable laser may be set by a switching signal interpreter and interposer circuit.

The modulators of all of the Bridge Interface Chips may be controlled by a CMOS modulator driver. In such a driver, the destination information (usually located partly or wholly in the header of the data packet to be transmitted) is decoded and converted into a wavelength of light and hence a physical destination.

Further features that may be included in embodiments of the invention will now be set out. These are applicable singly or in any combination with any aspect of the invention.

The connection between each Bridge Interface Chip and the corresponding port of the passive optical router may be a direct connection such as an optical cable which extends from an output port of the Bridge Interface Chip to an input port of the optical switch fabric. In particular, the connection may be an active optical cable, AOC.

The passive optical router may in fact be a plurality of passive optical router chips. These may be positioned adjacent one another. The number of optical router chips will depend upon the number of electrical chips to which the optical bridge is to be connected and also upon how many optical ports each optical router chip contains.

The passive optical router may be thermally stabilised.

The optical bridge may be an optical backplane switch which should be understood to correspond to an optical bridge which can be used to interconnect switches in a datacenter. Such optical backplane architecture may be particularly useful for applications where only one switch layer is in the optical domain, and also for applications in which distances are sufficiently short in the optical link such that no regeneration is required. In this way, the optical losses result in a link-budget that is acceptable with no regeneration.

The passive optical router may include one or more Arrayed Waveguide Gratings (AWGs).

In this way, when a (wavelength tunable) modulated optical signal is transmitted to an AWG, its path through the AWG will depend on its wavelength. Thus, by tuning the wavelength of a tunable laser which is input into a Bridge Interface Chip, it is possible to select the output port of the AWG. As each output port of the AWG is in turn connected to an input port of a Bridge Interface Chip, which is in turn located at a particular port of an electrical chip, switching between electrical ports of the electrical chips is therefore performed. Switching may occur between one port on an electrical chip and another port on the same electrical chip as well as between two ports on different electrical chips.

Instead of or in addition to an AWG, other suitable passive optical routers could be used, for example, the passive optical router may be a tapped delay line circuit or an Echelle grating.

Each passive optical router may be an SOI or other silicon photonic chip, silica on silicon, or any suitable alternative.

Where a passive optical router is an AWG, the AWG may be an N×N SOI AWG with N input fibers and N output fibers.

The passive optical router may include a plurality of AWGs. Where this is the case, and the AWG is in fact a plurality of AWGs, each AWG may be located at a separate switch location of a datacenter chassis.

Each of the plurality of Bridge Interface Chips may be pluggable. For example, they may be Quad (4-channel) Small Form-Factor pluggable transceivers.

One or more of the Bridge Interface Chips may take the form of a single transceiver package comprising: a tunable laser which provides the tunable laser input of the transceiver; and the modulator of the transceiver. In this way, the transceiver package forms a single component or "black box" which can be connected to an electrical chip.

In this way, the wavelength tunable laser and the corresponding modulator which modulates the output from the wavelength tunable laser form part of a single package at the corresponding electrical chip. The one or more wavelength tunable lasers may be hybrid-integrated into the Bridge Interface Chip modules, in which case the Bridge Interface Chip chips have no unmodulated optical inputs. This single component provides an optical bridge which is simple to plug to the electrical chips.

Alternatively, the optical bridge may further comprise a plurality of wavelength tunable lasers located at one or more locations which are separate from the locations of the modulators of the Bridge Interface Chips; each one of the wavelength tunable lasers providing the wavelength tunable input for each of the respective Bridge Interface Chips. For example, the wavelength tunable lasers may all be located at a tunable laser module (tunable laser bank) and the modulators may each be located at the corresponding electrical chip, either connected to the chip in a pluggable manner or connected to the chip in a fixed manner so that the Bridge Interface Chip is part of the chip.

Where the optical bridge includes such a tunable laser module/bank, an optical cable will connect each wavelength tunable laser of the tunable laser module to a given modulator. The optical cable, such as an SMF fiber may form an optical connection to the modulator by connecting to an optical input port on a Bridge Interface Chip, the optical input port of the Bridge Interface Chip being in optical connection with the optical input of the modulator itself.

Multiple Bridge Interface Chips could be packaged together to form a multiple Bridge Interface Chip transceiver. Moreover Bridge Interface Chips may have integrated onto them more than one functional electrical to optical converter and more than one optical to electrical converter. In other words, a single chip could be fabricated to contain more than one of the above Bridge Interface Chips.

In the examples above, there would be one wavelength tunable laser per Bridge Interface Chip. However, it is also envisaged that a single wavelength tunable laser could provide the wavelength tunable input for more than one Bridge Interface Chip.

When one wavelength tunable laser inputs to multiple Bridge Interface Chips, optical power splitters, star couplers, or multiplexers/demultiplexers may be used to divide the power from one tunable laser to the inputs of multiple Bridge Interface Chips. A plurality of Bridge Interface Chips could be integrated onto one chip i.e. a single chip having an integer number, n of photodetectors, n modulators and 1 laser split into n paths for providing the wavelength tunable inputs for the modulators. Furthermore higher degrees of chip integration could be envisaged in which n lasers could be integrated with splitters to light n×m modulators in a multi-wavelength Bridge Interface Chip device.

Regardless of whether the wavelength tunable lasers for each Bridge Interface Chip are located in the same package or in a separate location to the Bridge Interface Chip modulators, each Bridge Interface Chip may include: an outgoing conversion portion comprising: an optical input for receiving an unmodulated optical signal from one of the wavelength tunable lasers; an electrical input for receiving an electrical signal from the electrical switch fabric; the modulator of the Bridge Interface Chip; and an optical output for transmitting a modulated optical signal from the modulator to the optical switch fabric; where the outgoing direction is the direction out of the Bridge Interface Chip towards the passive optical router.

Furthermore, each Bridge Interface Chip may also include an incoming conversion portion comprising: an optical input for receiving an optical signal from the passive optical router; a photodiode; and an electrical output for transmission of the electrical signal to the electrical chip; where the incoming direction is the direction from the passive optical router towards the Bridge Interface Chip. The photodiode may be a germanium photodiode but may be any device capable of converting an optical signal into an electrical signal.

Optionally, the one or more of the Bridge Interface Chips includes separate chips; a first chip for electrical to optical conversion and a second chip for optical to electrical conversion. In such embodiments in which the Bridge Interface Chip includes separate chips, the chips may be mounted on a PCB. This is particularly the case where the Bridge Interface Chips are not integrated directly with the electrical chips.

Optionally, one or more of the one or more Bridge Interface Chips includes a silicon photonic chip. In this way, the manufacturing process can be simplified and associated costs reduced. In addition, silicon photonic components may provide low polarization dependence and less crosstalk (particularly for example in the context of silicon AWGs over AWGs manufactured from other materials). Silicon photonic components also give rise to power-efficient integrated laser sources. Optionally, all Bridge Interface Chips may include silicon photonic chips.

Furthermore, at least one of the Bridge Interface Chip modules may be an integrated chip. In this way, the modulator and the receiver may be fabricated on the same chip, thereby minimizing fabrication time and cost. The modulator driver (e.g. a CMOS modulator driver) and one or more other components of the Bridge Interface Chip can either be integrated onto a silicon photonic transceiver chip (e.g. flip-chip or monolithically), or can be mounted on a PCB adjacent to the silicon photonic chip(s) and electrically connected via wirebonds. Each of the Bridge Interface Chips may include a monolithic optical modulator and/or a monolithic photodiode.

Each Bridge Interface Chip may comprise M×2 optical ports for connection to the passive optical router, M outgoing ports for transmitting M signals to the passive optical router, and M incoming ports for receiving M signals from the passive optical router, and may comprise M×2 electrical ports for connection to each electrical chip. In this way, duplex connectivity is provided.

Optionally, each of the optical connections between the Bridge Interface Chips and the passive optical router may be bi-directional.

In this way, the number of optical connections between the passive optical router and therefore the number of connection ports required is halved as compared to the case where separate optical connections are required to provide the outgoing and incoming optical signals.

Where optical connections between the Bridge Interface Chips and the passive optical router are bi-directional, the Bridge Interface Chip may comprise a 2×2 coupler which couples the bi-directional optical connection to the output of the modulator but also to the photodiode or any other optical-to-electrical converter.

Bi-directional Bridge Interface Chip module chips may comprise M bidirectional optical ports for connection to the passive optical router and may comprise M×2 electrical ports for connection to each electrical chip.

According to a second aspect of the present invention, there is provided an optical switch system comprising the optical bridge of any one of the preceding claims and a plurality of electrical chips, each electrical chip being connected to the optical bridge via one or more Bridge Interface Chips.

Optionally, each electrical chip may be connected to two Bridge Interface Chips.

The plurality of electrical chips may be a plurality of electrical switches (such as Broadcom Trident or TOMAHAWK™ electrical packet switches) which makes up an electrical switch fabric. Alternatively or additionally, the electrical chips of the plurality of electrical chips may include: memory devices; storage devices; and/or microprocessors.

The optical switch system may comprise a controller which controls switching between the electrical chips via control of the wavelength of the wavelength tunable laser inputs.

A controller may be located within one or more, or all of the Bridge Interface Chips, or the electrical chips themselves. Alternatively or additionally a controller may be located externally to the Bridge Interface Chips.

The controller preferably includes at least a scheduler which decides how to tune the wavelengths used to switch each packet/piece of data and may also include a CPU.

Where a controller is external, it may be located in a separate module which is communicably connected to each of the Bridge Interface Chips via a controller bus. Alternatively, it may be located with a switching module which also contains the passive optical router and may be communicably connected directly with each of the Bridge Interface Chips. Where the optical switch system functions as a packet switch, the controllers are preferably located with the Bridge Interface Chips. Where the optical switch system functions as a circuit switch, no packet information is required for switching to take place so the controller may be external and may be communicably connected to each of the electrical chips.

Each electrical chip may be an electrical data switch, such as a packet switch, top of rack (TOR) electrical switch in a data center or a folded Clos switch.

In particular, each electrical chip may be a line card, such as an electrical packet switch line card for a Clos aggregation switch. More particularly, the electrical chips could be a line card for a 3-stage folded Clos aggregation switch.

The optical switch system may comprise 12 electrical chips (e.g. TOR switches); wherein the passive optical router takes the form of 6 AWGs which may be 24×24 AWGs. Another suitable optical switch system for 12 electrical switches could use one single 144×144 AWG.

According to a third aspect of the present invention, there is provided a method of switching between a plurality of electrical chips, the method comprising the steps of: providing an optical bridge comprising: a passive optical router; and a plurality of Bridge Interface Chips, each Bridge Interface Chip comprising a wavelength tunable laser input and a modulator; connecting each of the plurality of Bridge Interface Chips to one of the plurality of electrical chips to form a connection between the passive optical router and the connected electrical chip; at each Bridge Interface Chip, converting electrical signals from the connected electrical chip into wavelength tuned modulated optical signals via modulation of the wavelength tunable laser input by the modulator; and at each Bridge Interface Chip, converting optical signals from the passive optical router into electrical signals to be received by the connected electrical chip.

Further optional features of the invention are set out below.

BRIEF DESCRIPTION OF THE DRAWINGS

Embodiments of the invention will now be described by way of example with reference to the accompanying drawings in which.

DETAILED DESCRIPTION

The detailed description set forth below in connection with the appended drawings is intended as a description of exemplary embodiments of an optical bridge provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
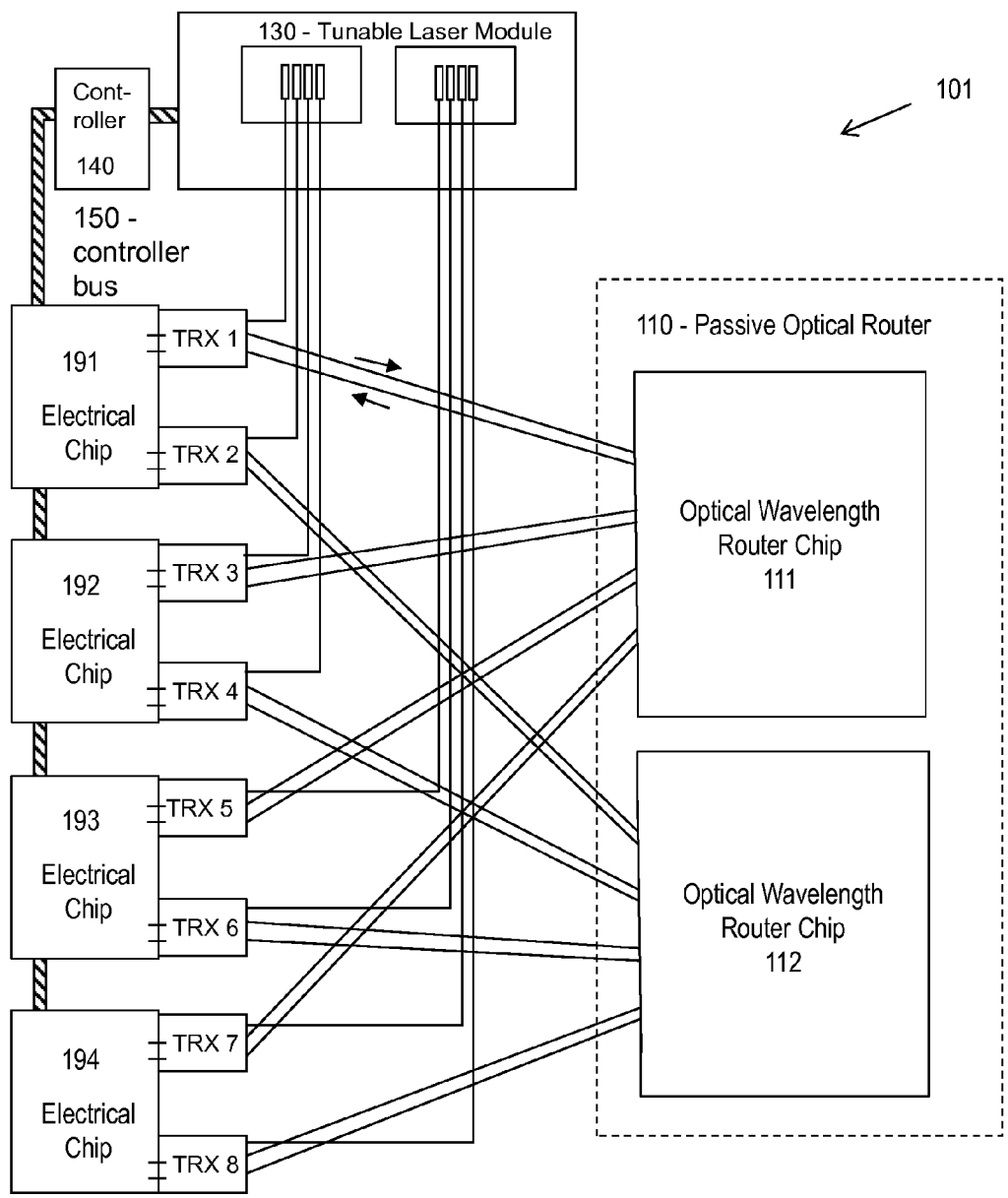
FIG. 1 shows a schematic diagram of an optical bridge according to a first embodiment of the present invention connected to a plurality of electrical chips.

With reference to FIG. 1, a first embodiment of the optical bridge 101 for switching between a plurality of electrical chips is shown.

The optical bridge 101 comprises a passive optical router 110 and a plurality of Bridge Interface Chips in the form of transceivers TRX 1-TRX 8.

The transceivers TRX 1-TRX 8 are connected to the passive optical router 110 via optical connections. Each optical connection connects a port of the passive optical router to a corresponding optical port on one of the plurality of transceivers. In the embodiment shown each optical connection between a transceiver and the passive optical router is mono-directional (e.g. because the optical connection is a single mode fiber SMF), which means that a first connection to each transceiver forms an outgoing optical connection from the transceiver to the passive optical router, and a second connection to each transceiver forms an incoming connection from the passive optical router to the transceiver.

Each of the plurality of transceivers TRX 1-TRX 8 is connected to one of the plurality of electrical chips 191-194 between which data is to be transferred. In fact, each of the plurality of electrical chips shown in FIG. 1 has two input/output ports, and two transceivers of the optical bridge are connected to the two ports respectively, each port comprising at least a pair of electrical pins.

Each transceiver TRX 1-TRX 8 converts electrical signals that it receives from the connected electrical chip 191-194 into wavelength tuned modulated optical signals for transmission to the passive optical router. In addition, each transceiver will also convert optical signals it receives from the passive optical router 110 into electrical signals to be received by the connected electrical chip 191-194.

Each of the Bridge Interface Chips (transceivers) TRX 1-TRX 8 includes a wavelength tunable input and a modulator (not shown in FIG. 1) which performs modulation of the wavelength tunable input to convert any electrical signal input into the transceiver into a wavelength tunable modulated optical signal for transmission to the passive optical router.

The passive optical router takes the form of two optical router chips 111, 112 each of which is an arrayed waveguide grating (AWG) chip.

The optical bridge 101 includes a tunable laser module 130 that comprises an array of wavelength tunable lasers, each wavelength tunable laser providing the wavelength tunable laser input for a specific transceiver TRX 1-TRX 8. The wavelength tunable lasers are therefore separate from the transceivers TRX 1-TRX 8 of the optical bridge 101.

Figure 2:
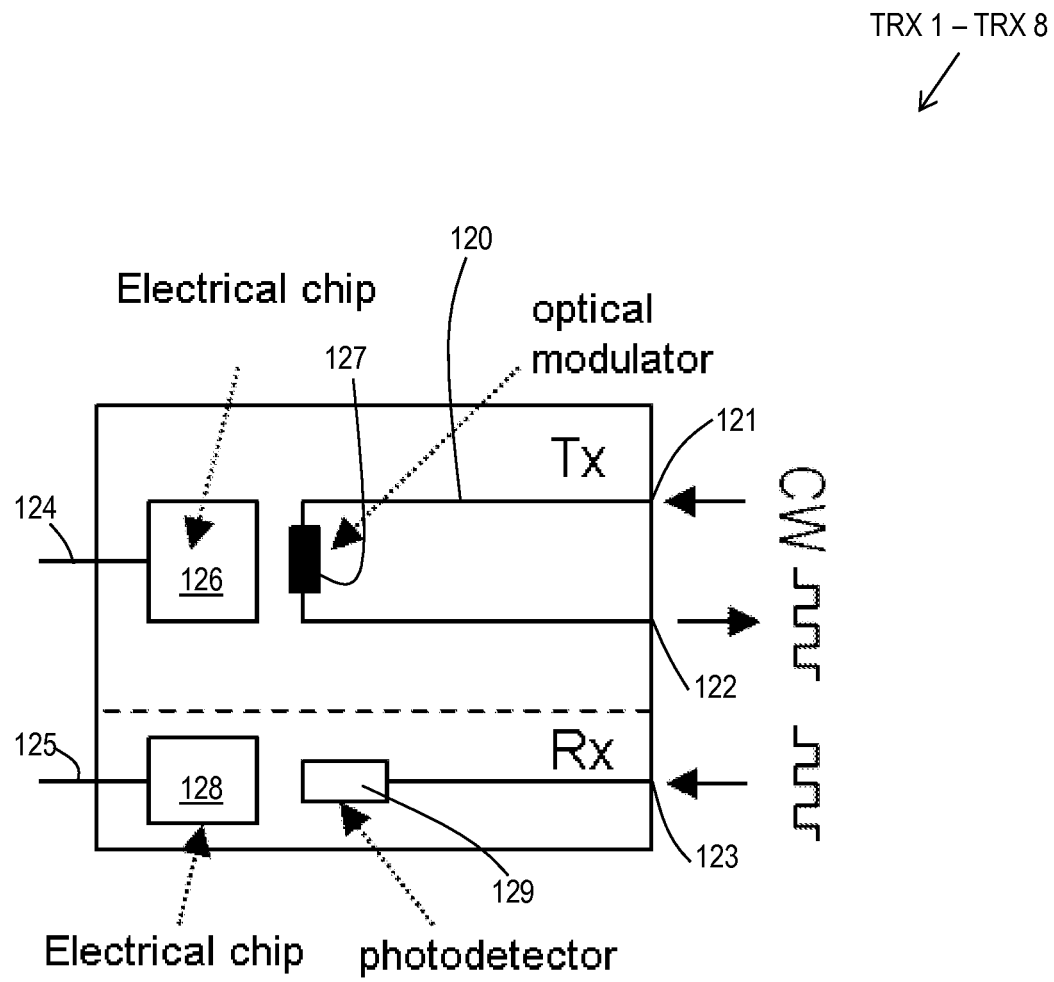
FIG. 2 shows a schematic diagram of a Bridge Interface Chip in the form of a transceiver for use in the optical bridge fabric shown in FIG. 1.

FIG. 2 shows a detailed example of a transceiver suitable for use in the optical bridge of embodiments such as that of FIG. 1 where the tunable laser which produces the wavelength tunable laser input 120 is located at a tunable laser module 130 (not shown in FIG. 2) separate from the transceiver body, particularly in a separate package from the package TRX 1-TRX 8 in which the modulator of the transceiver is located. Transceivers TRX 1-TRX 8 are all pluggable i.e. they are removably coupleable to the electrical chips 191-194 between which the optical bridge switches.

Each of the transceivers TRX 1-TRX 8 comprises three optical ports 121, 122, 123 on the right side (the optical side) and two electrical ports 124, 125 on the left hand side (the electrical side for connection to an electrical chip).

The three optical ports comprise: a first optical port 121 for incoming tunable laser light into the transceiver from the tunable laser array (i.e. for the unmodulated wavelength tunable signal); a second optical port 122 for the modulated wavelength tunable optical signal which is transmitted from the transceiver towards the passive optical router; and a third optical port 123 for optical signals sent from the passive optical router and received by the transceiver.

The two electrical ports comprise: a first electrical port 124, for electrical signals from the electrical chip to the modulator to be converted into a modulated optical signal for transmission to the passive optical router; and a second electrical port 125 for sending electrical signals back to the electrical chip which have been converted from optical signals (from the passive optical router) into electrical signals.

The transceiver is made up of an outgoing conversion portion Tx and an incoming conversion portion Rx.

At the outgoing conversion portion Tx, an electrical signal received by the first electrical port 124 will be sent to an electrical chip 126, and an unmodulated wavelength tunable laser input 120 will be received by the transceiver package TRX 1-TRX 8 at the first optical port 121 will be sent to an optical modulator 127. The optical modulator is in communication with the electrical chip and is configured to modulate the unmodulated (CW) tunable laser input 120 to produce a modulated optical output signal, the modulation corresponding to the information carried by the electrical signal received at the first electrical port. The modulated optical output signal is transmitted via the second optical port 122 to the passive optical router 110.

In this embodiment, where the tunable laser is separate from the modulator, an optical connection such as an optical fiber is provided between the relevant tunable laser on the tunable laser module and the input port 121 of the transceiver TRX 1-TRX 8. In addition, a communication link between the controller and the tunable laser module enables the controller to select the wavelength of the tunable laser inputs, to pick a particular path through the passive optical router.

At the incoming portion Rx of the transceiver TRX 1-TRX 8, a modulated optical signal is received at the third optical port 123 and sent to a photodetector in the form of photodiode 129 at which it is converted into an electrical signal. The electrical signal is then transmitted to the connected electrical chip 191-194 via electrical chip 128 and the second electrical port 125.

The photodetector may be a conventional photodiode such as a germanium photodiode.

The optical bridge also comprises a control system including controller 140 and controller bus 150 (FIG. 1). The controller is connected to the tunable laser module 130 and is connected to each of the electrical chips 191-194 via controller bus 150. The control bus is shown connecting the electrical chips but could alternatively be used to directly connect each of the Bridge Interface Chips with one another and to the controller.

The tunable laser array could be an array of hybrid III-V/Si photonic lasers, ether in the form of multiple hybridized chips or a single hybridized array chip. Alternatively the laser array could comprise, III-V only chips, multiple III-V chips mounted onto a carrier or PCB and/or packaged, or any other suitable laser/configuration. The operating wavelength of array of lasers can, for example, be in 1550 nm region (C-band), 1600 nm region (L-band), or 1310 nm region (O-band).

Figure 3:
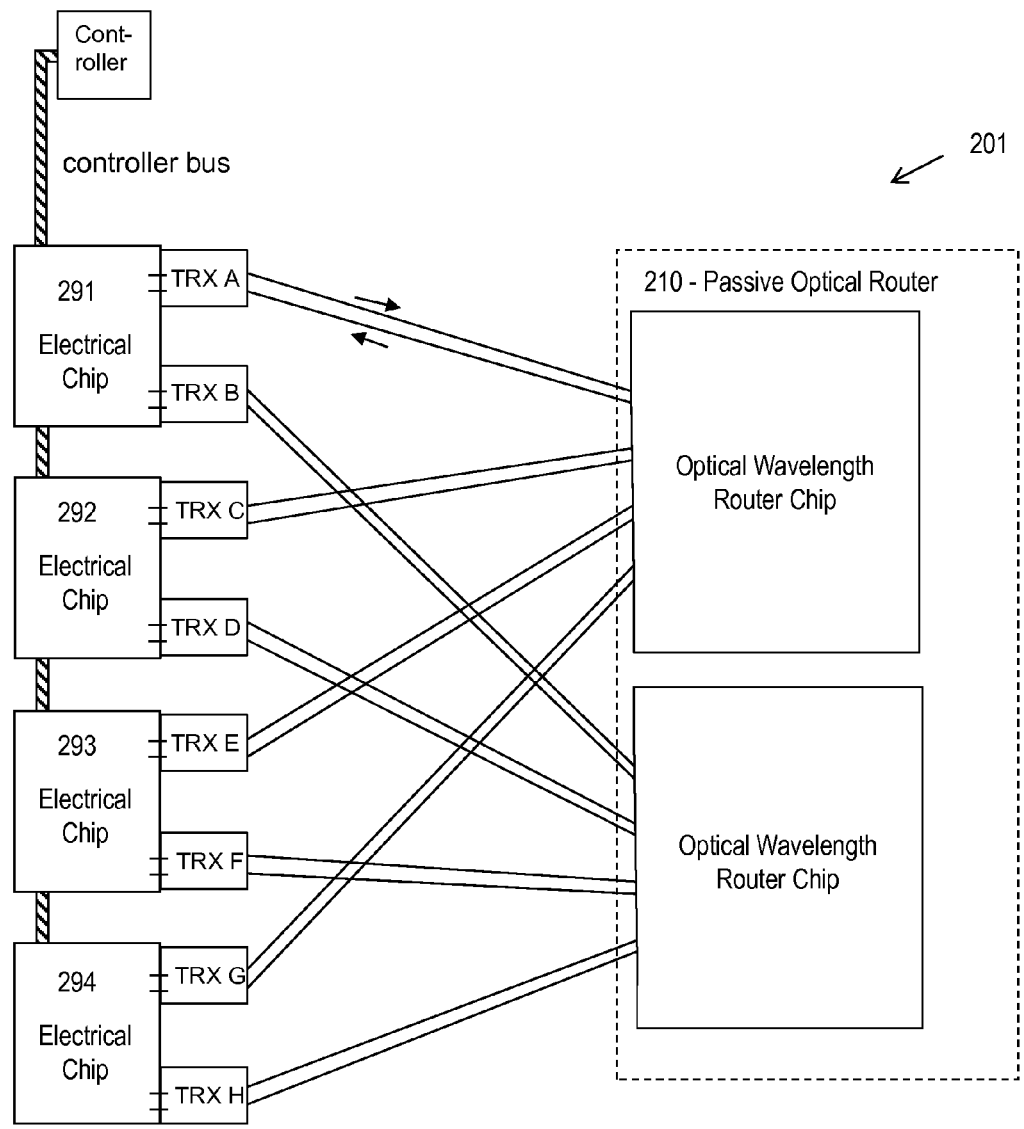
FIG. 3 shows a schematic diagram of an optical switch system including an optical bridge according to a second embodiment of the present invention.

A second embodiment of the present invention is described below with reference to FIGS. 3 and 4. FIG. 3 shows an optical switch system comprising the optical bridge 201 of the second embodiment connected to a plurality of electrical chips 291-294.

The second embodiment differs from the first embodiment in that the wavelength tunable laser input for each transceiver is provided by a tunable laser which is located adjacent the modulator to which it provides the input. In this way, a single Bridge Interface Chip package includes both the modulator and the laser. The single package is pluggable and may, as with the first embodiment take the form of a QSFP package. In some embodiments a Bridge Interface Chip may include more than one photodetector, more than one modulator, and/or more than one tunable laser.

Each of the Bridge Interface Chips TRX A-TRX H are Si photonic, and the tunable lasers 131 are integrated onto the Si photonic chip.

Figure 4:
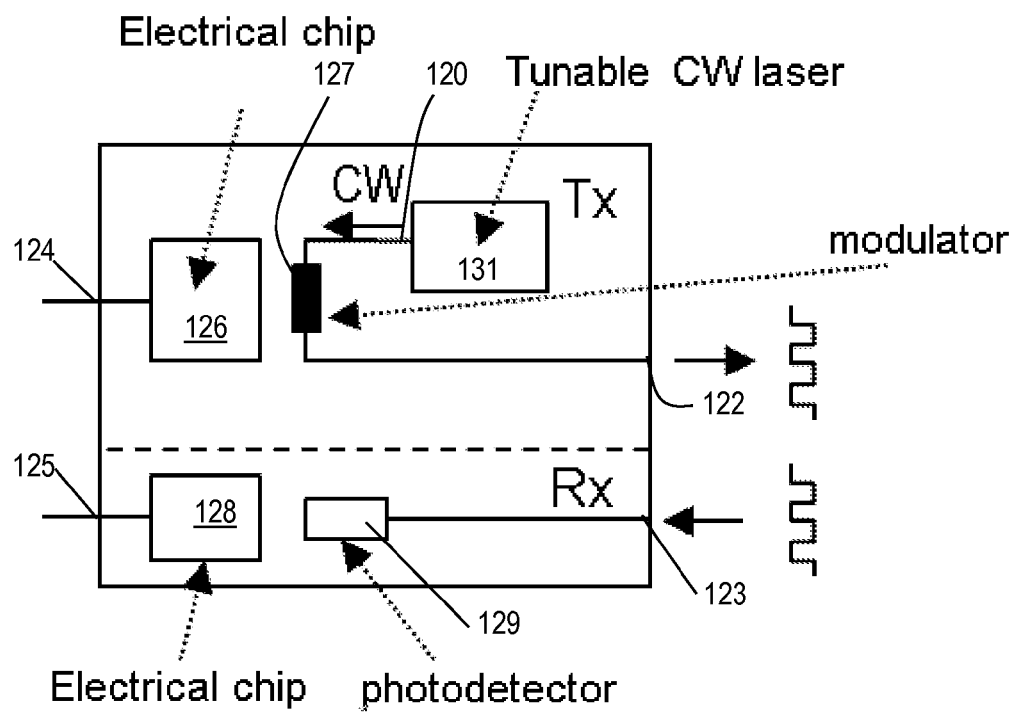
FIG. 4 shows a schematic diagram of a Bridge Interface Chip in the form of a transceiver for use in the optical bridge fabric shown in FIG. 3.

As shown in FIG. 4, the Bridge Interface Chips TRX A-TRX H differ from the Bridge Interface Chips of FIG. 2 in that they have only two optical ports on the right side: an optical output port 122 for the modulated wavelength tunable optical signal, and an optical input port 123 for the optical signal received from the passive optical router. There may be no CW input as the CW wavelength tunable laser light 120 is generated on the chip itself by wavelength tunable laser 131.

The tunable lasers, integrated into the Bridge Interface Chips, each of which takes the form of a Si photonic transceiver chip, can be individual III-V chips hybridized. Either in the form of one hybridized chip for each transceiver, or a single array with number of channels equal to number of optical output ports per electrical chip.

Figure 5:
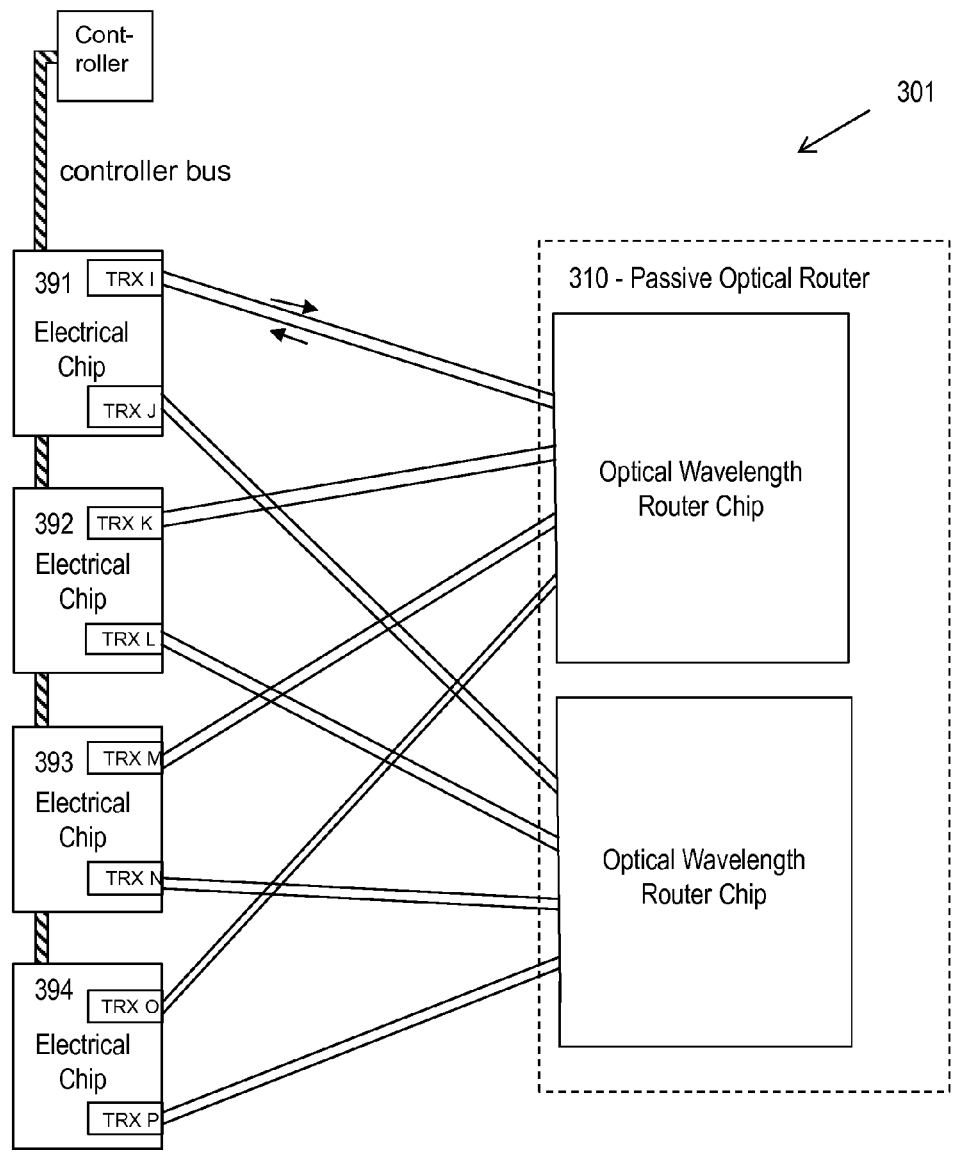
FIG. 5 shows a schematic diagram of an optical switch system including an optical bridge according to a third embodiment of the present invention.

A third embodiment is described below with reference to FIG. 5. The third embodiment differs from that of the second embodiment in that the Bridge Interface Chips are directly integrated onto the electrical chip. In the embodiment shown, in FIG. 5, the Bridge Interface Chips in the form of transceivers are located at the electrical chip, for example flip-chip bonded onto the electrical chip. As with above described embodiments, the electronic chip is configured for duplex transmission.

Figure 6:
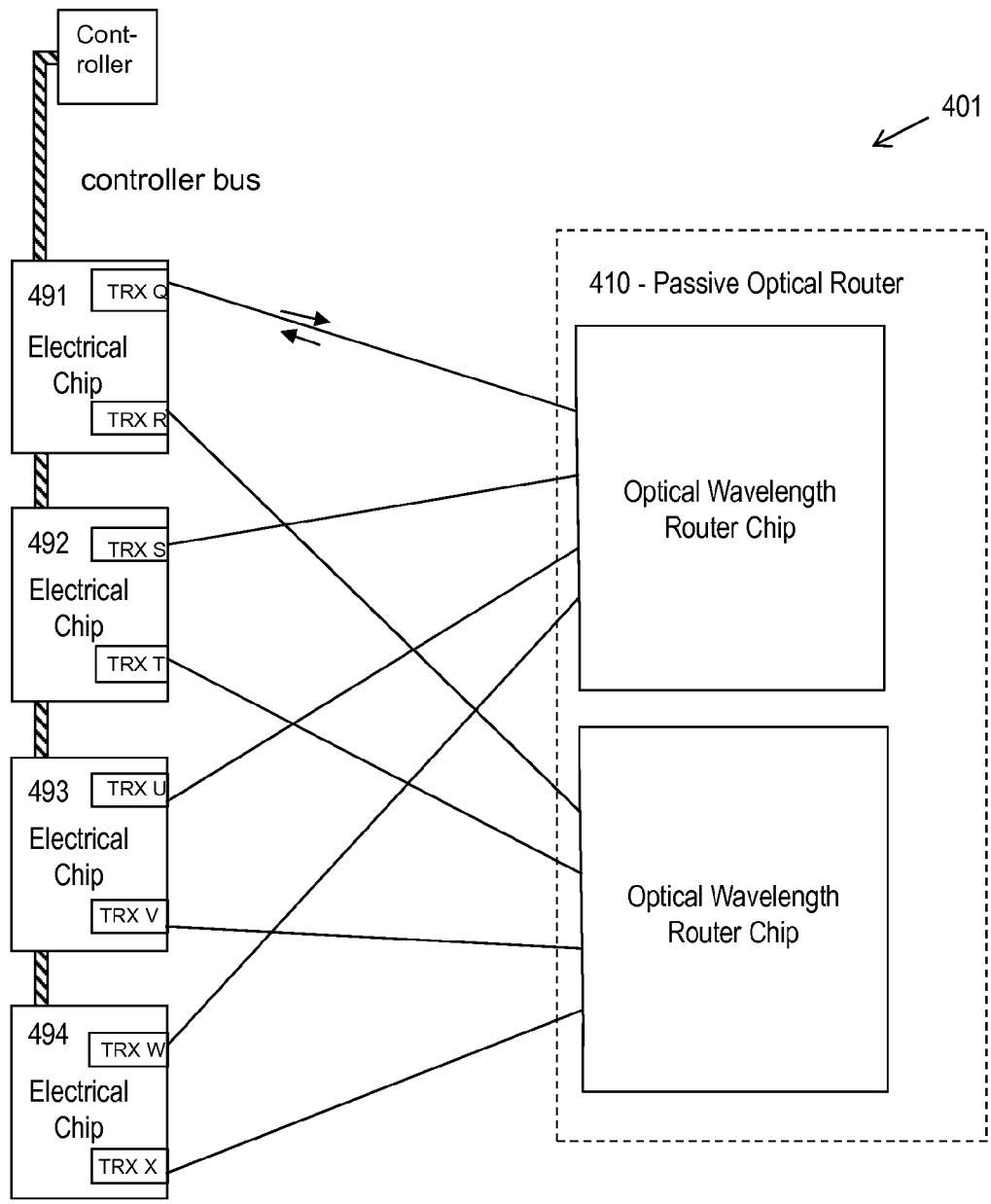
FIG. 6 shows a schematic diagram of an optical switch system including an optical bridge according to a fourth embodiment of the present invention.

A fourth embodiment is described below with reference to FIGS. 6, 7A and 7B. The fourth embodiment differs from the third embodiment in that the Bridge Interface Chips in the form of transceivers are bi-directional so the input and output signals are transmitted on the same fibers.

This arrangement reduces the number of fibers and therefore reduces the number of needed ports on the Wavelength Router Chip by a factor of two.

Although shown as an adapted version of the third embodiment, this bidirectional feature (i.e. the combination of bi-directional transceivers and optical cables between the transceivers and passive optical router) could be applied to any of the other embodiments described herein.

Figure 7A:
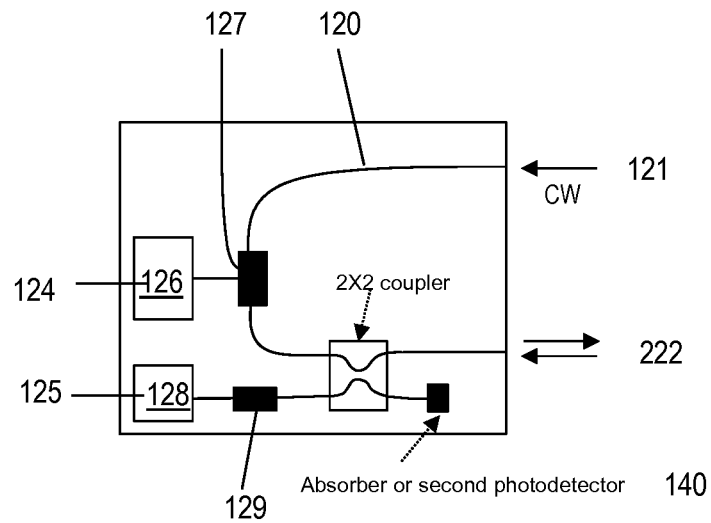
FIG. 7A shows a bi-directional transceiver for use with an optical bridge in which the tunable laser input comes from a wavelength tunable laser located at a separate location to the modulator of the transceiver, in one example of a Bridge Interface Chip for use with various embodiments of the present invention.
Figure 7B:
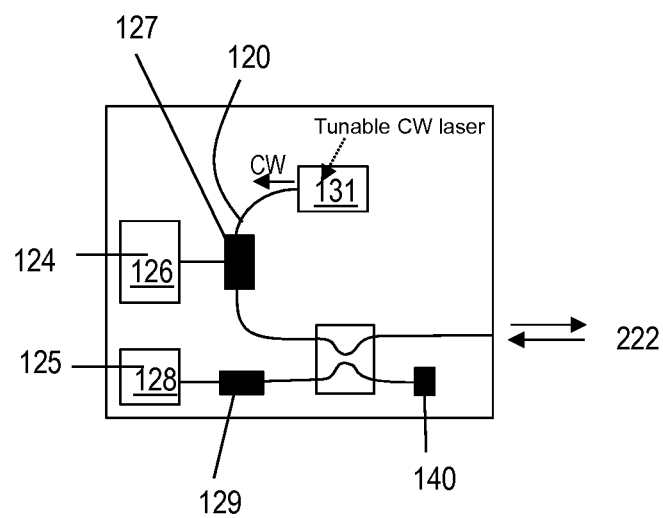
FIG. 7B shows a bi-directional transceiver for use with an optical bridge in which the tunable laser that provides the wavelength0tunable laser input is located in a single package with the modulator of the transceiver in another example of a Bridge Interface Chip for use with various embodiments of the present invention.

As shown in FIGS. 7A and 7B, the transceiver for use with the fourth embodiment of the present invention differs from the previous transceiver embodiments in that it is configured for bi-directional operation by inclusion of a 2×2 coupler 170.

Two versions of the bi-directional transceiver are shown. The first, shown in FIG. 7A has an optical input port for an unmodulated tunable wavelength input as in the transceiver of FIG. 2 and is therefore configured for use with an optical bridge that includes a separate laser module 130. Like reference numbers correspond to those features described above in relation to the previously described transceivers.

The second, shown in FIG. 7B has only two optical inputs as the wavelength tunable laser which provides the wavelength tunable input to the modulator is located in the same transceiver package as the modulator as in the transceiver of FIG. 4. Again, like reference numbers correspond to those features described above in relation to the previously described transceivers.

As with any of the Bridge Interface Chips disclosed herein, the transceiver chips of FIGS. 7A and 7B may be made of any one of a variety of materials but is typically a silicon chip, more specifically, a silicon on insulator (SOI) chip.

In the transceiver shown in FIG. 7A, the CW unmodulated wavelength tunable input 120 is received from the separate wavelength tunable laser (not shown) at a first input port 121. This light is then transmitted via waveguide to the optical modulator 127 which is controlled by electronic chip 126. The modulated light signal passes through the coupler 170 and leaves the chip via a waveguide connected to bi-directional input/output port 222. Coupler 222 may be an evanescent coupler causing a fraction of the modulated light signal to be collected at monitor 140 to enable feed-back to controls for the laser and modulator electronic circuits.

Light signals received by the chip at bi-directional input/output port 222 are transmitted via waveguide and are coupled via the coupler 170 to the photodiode 129. The electronic chip 128 receives and, if necessary amplifies and applies compensation to, the signal which is transmitted as an electric signal via electrical output port 125.

FIG. 7B differs from FIG. 7A in that the wavelength tunable laser 131 is located on the transceiver chip.

As with all of the Bridge Interface Chips of described herein, the transceivers of FIGS. 7A and 7B may be pluggable in that they may include connection pins which can be arranged in various standard or non-standard configurations and may form a hot pluggable device.

Alternatively, the Bridge Interface Chips may be integrated onto an electrical chip such as an electrical switch.

Figure 8:
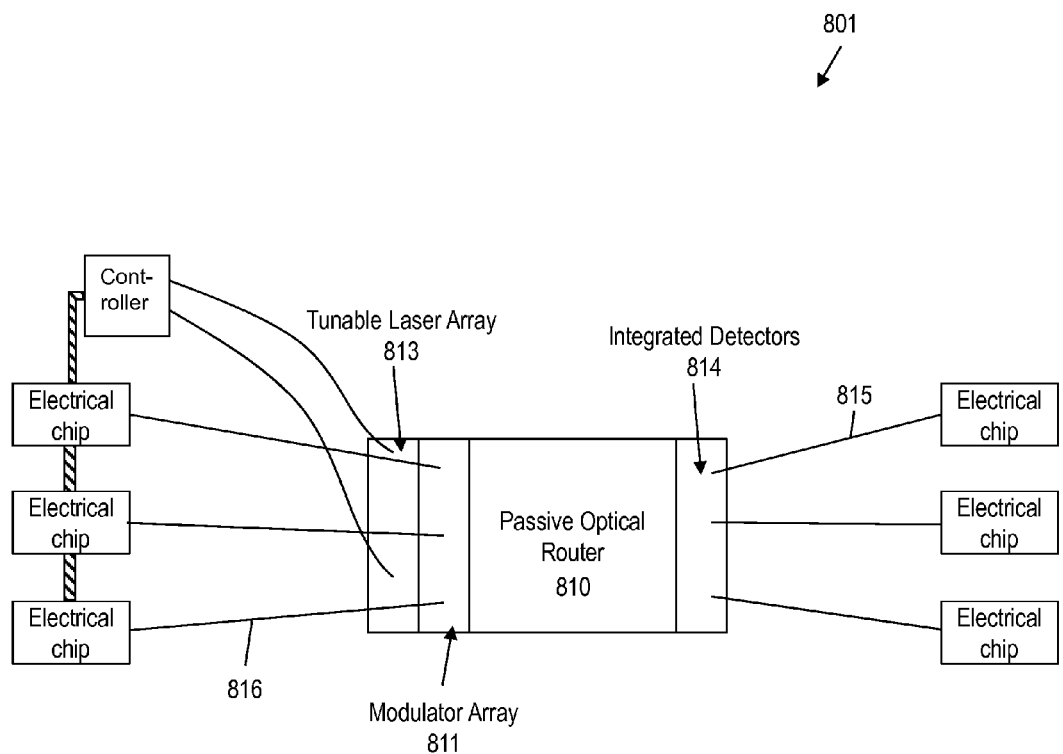
FIG. 8 shows an alternative optical switch system.

Electrical chips 126, 128 may be combined to form a single chip or circuit and more than one Bridge Interface Chip/transceiver may share electronic chips and circuits. An alternative optical switch system 801 is shown in FIG. 8. This system differs from those of the previous figures in that the modulators are arranged as an array of modulators 811 at the input to the passive optical router 810 (for example the input facet of an AWG chip), each modulator having an output which is optically connected to an input of the passive optical router.

An array of tunable lasers 813 is located adjacent the array of modulators.

The electrical chips may be electrical switches such as a top of rack TOR switches but could in fact take the form of any type of electrical chip and the electrical chips are connected to the arrays of modulators via electrical cables.

At the output end of the passive optical router, the connections to the electrical chips could be optical or as shown here an array of detectors 814 could be integrated with the passive optical router so that the connections 815 from the optical package to the electrical chips would then be electrical. These configurations may be of use to a customer who is unfamiliar with optical fiber connections and would prefer an (apparently) all electrical operating environment. The tunable lasers and optical modulators could be standard off-the-shelf tunable devices (such as integrated laser Mach-Zehnders) or a combination of separate lasers and appropriate modulators.

Input connections 816 between the electrical chips and the modulator array 811 are also electrical.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. The invention is also defined in the following claims, and equivalents thereof.

What is claimed is:

1. An optical bridge for switching between a plurality of electrical chips, the optical bridge comprising:
    a passive optical router, an optical path through which is wavelength dependent; and
    a plurality of Bridge Interface Chips optically connected to the passive optical router; each Bridge Interface Chip being connectable to one of the plurality of electrical chips to form a connection between that electrical chip and the passive optical router;
    each Bridge Interface Chip including a wavelength tunable laser input and a modulator configured to convert unmodulated light, received at the tunable laser input, into modulated light, according to electrical signals from the electrical chip, for transmission to the passive optical router;
    each Bridge Interface Chip including a photodiode configured to convert optical signals from the passive optical router into electrical signals to be received by the electrical chip,
    a first Bridge Interface Chip of the plurality of Bridge Interface Chips being connected directly to a second Bridge Interface Chip of the plurality of Bridge Interface Chips through the passive optical router, and
    the passive optical router consisting of one or more arrayed waveguide grating chips.

2. The optical bridge of claim 1, wherein an output port of the passive optical router is directly optically connected to an input port of a Bridge Interface Chip of the plurality of Bridge Interface Chips.

3. The optical bridge of claim 1, wherein the optical bridge is an optical backplane switch.

4. The optical bridge of claim 1, wherein the passive optical router consists of one arrayed waveguide grating chip.

5. The optical bridge of claim 1, wherein one or more of the Bridge Interface Chips takes the form of a single Bridge Interface Chip package comprising:
    a tunable laser which provides the tunable laser input of the Bridge Interface Chip;
    the modulator of the Bridge Interface Chip; and
    the photodiode of the Bridge Interface Chip.

6. The optical bridge of claim 1, further comprising a plurality of wavelength tunable lasers located at one or more locations which are separate from the locations of the modulators of the Bridge Interface Chips; each of the wavelength tunable lasers being directly connected to the wavelength tunable laser input of a respective Bridge Interface Chip of the plurality of Bridge Interface Chips.

7. The optical bridge of claim 1, wherein one or more of the Bridge Interface Chips comprise:
    a plurality of modulators; and
    a plurality of photodetectors.

8. The optical bridge of claim 7, wherein the one or more Bridge Interface Chips further comprise a plurality of wavelength tunable lasers.

9. The optical bridge of claim 1, wherein one of the Bridge Interface Chips includes a first chip for electrical to optical conversion and a second chip for optical to electrical conversion, the first chip and the second chip being separate chips.

10. The optical bridge of claim 1, wherein each of the Bridge Interface Chips includes a silicon photonic chip.

11. The optical bridge of claim 1, wherein the optical connections between the Bridge Interface Chips and the passive optical router are bi-directional.

12. The optical bridge of claim 11, wherein each Bridge Interface Chip comprises a 2×2 coupler configured to couple the bi-directional optical connection to an output of the modulator and to an optical-to-electrical converter.

13. The optical bridge of claim 1, wherein the optical bridge is configured to route each respective modulated optical signal of the modulated optical signals through the passive optical router at a single tuned wavelength.

14. An optical switch system comprising the optical bridge of claim 1 and a plurality of electrical chips, each electrical chip being connected to the optical bridge via one or more Bridge Interface Chips, each electrical chip being configured to receive electrical signals and to transmit electrical signals.

15. An optical switch system comprising:
    an optical bridge for switching between a plurality of electrical chips, the optical bridge comprising:
        a passive optical router, an optical path through which is wavelength dependent; and
        a plurality of Bridge Interface Chips optically connected to the passive optical router; each Bridge Interface Chip being connectable to one of the plurality of electrical chips to form a connection between that electrical chip and the passive optical router:
            each Bridge Interface Chip including a wavelength tunable laser input and a modulator configured to convert electrical signals from the electrical chip into wavelength tunable modulated optical signals for transmission to the passive optical router; and
            each Bridge Interface Chip including a photodiode configured to convert optical signals from the passive optical router into electrical signals to be received by the electrical chip; and
    a plurality of electrical chips, each electrical chip being connected to the optical bridge via one or more Bridge Interface Chips,
    wherein each electrical chip is connected to two Bridge Interface Chips.

16. The optical switch system of claim 14, wherein a controller configured to control switching between the electrical chips via control of the wavelength of the wavelength tunable laser inputs is located within each of the Bridge Interface Chips.

17. An optical switch system comprising:
    an optical bridge for switching between a plurality of electrical chips, the optical bridge comprising:
        a passive optical router, an optical path through which is wavelength dependent; and a plurality of Bridge Interface Chips optically connected to the passive optical router; each Bridge Interface Chip being connectable to one of the plurality of electrical chips to form a connection between that electrical chip and the passive optical router;

each Bridge Interface Chip including a wavelength tunable laser input and a modulator configured to convert electrical signals from the electrical chip into wavelength tunable modulated optical signals for transmission to the passive optical router; and each Bridge Interface Chip including a photodiode configured to convert optical signals from the passive optical router into electrical signals to be received by the electrical chip; and a plurality of electrical chips, each electrical chip being connected to the optical bridge via one or more Bridge Interface Chips, wherein a controller configured to control switching between electrical chips via control of the wavelength of the wavelength tunable laser inputs is located externally to the Bridge Interface Chips and is connected to a controller bus, the controller bus being communicably connected to each of the Bridge Interface Chips.

18. The optical switch system of claim 14, wherein a controller configured to control switching between the electrical chips via control of the wavelength of the wavelength tunable laser inputs is located externally to the Bridge Interface Chips within a switching module which also contains the passive optical router.

19. The optical switch system of claim 14, wherein each electrical chip is a line card.

20. The optical switch system of claim 19, wherein each electrical chip is a line card for a 3-stage folded Clos aggregation switch.

21. The optical switch system of claim 14, wherein each electrical chip is a top of rack (TOR) electrical switch.

22. The optical switch system of claim 14, comprising a total of 12 electrical chips; wherein the passive optical router takes the form of 6 AWGs.

* * * * *